United States Patent [19]

Allen

[11] Patent Number: 4,653,422

[45] Date of Patent: Mar. 31, 1987

[54] HEADLIGHTS ON REMINDER

[76] Inventor: Coburn Allen, 1100 S. Atlantic, #102, Seattle, Wash. 98134

[21] Appl. No.: 758,215

[22] Filed: Jul. 23, 1985

[51] Int. Cl.⁴ .................... B60Q 11/00; A44B 15/00; A47G 29/10

[52] U.S. Cl. .................. 116/28 R; 116/306; 116/307; 70/456 R; 24/3 M; 24/115 H; 24/129 R; 24/300

[58] Field of Search .................. 116/28 R, 205, 306, 116/307; 70/389, 456 R, 457, 441; 40/2 A, 21 R, 330; 119/109, 153; D3/61–63; 24/3 K, 3 M, 115 H, 115 K, 128 R, 129 R, 298, 300–302

[56] References Cited

U.S. PATENT DOCUMENTS

| D. 153,839 | 5/1949 | Zahora | D3/61 |
|---|---|---|---|
| 213,215 | 3/1879 | Lewis | 24/128 R |
| 1,027,445 | 5/1912 | Sismondi | 40/21 R |
| 1,378,225 | 5/1921 | Goldman | 24/129 R |
| 1,816,642 | 7/1931 | Fetter | 116/28 R |
| 2,246,091 | 6/1941 | Forstner | 24/3 K |
| 2,297,661 | 9/1942 | Okun | D3/62 |
| 2,457,195 | 12/1948 | Bagnall, Jr. | 24/3 K |
| 2,536,118 | 1/1951 | Armstrong | 24/128 R |
| 3,094,755 | 6/1963 | Casanave | 24/129 R |
| 3,968,669 | 7/1976 | Coleman | 70/456 R |
| 4,159,792 | 7/1979 | Siegal | 24/3 M |
| 4,529,240 | 7/1985 | Engel | 24/129 R |

FOREIGN PATENT DOCUMENTS 405131  6/1966  Switzerland .................... 24/302

Primary Examiner—Charles Frankfort
Assistant Examiner—W. Morris Worth
Attorney, Agent, or Firm—Roy E. Mattern, Jr.

[57] ABSTRACT

A headlights on reminder apparatus provides a motorist with a convenient arrangement of apparatus to hold his or her ignition key, with or without other vehicle and/or household keys, for convenient temporary storage in his or her pocket or purse, or at a place in his or her office or home. Then when operating his or her vehicle, with the headlights on, a tethered hook of this arrangement of apparatus is placed about a vehicle component, while the tether remains secured to the ignition key holder and the ignition key remains in the ignition switch. Upon leaving the car, the motorist must release the hook, thereby remembering to turn off the headlights. In one embodiment the tether extends directly between the hook and the ignition key holder, and in another embodiment the tether, in extending between the hook and the ignition key holder, forms a changeable size loop, by utilizing a receiving and guiding body. The tether is preferably made of a resilient stretchable retractable material.

1 Claim, 4 Drawing Figures

HEADLIGHTS ON REMINDER

BACKGROUND

After an operational period in driving a car, when the headlights were turned on, when the car is stopped for a while, as the motorist goes away on foot, he or she may forget to turn off the headlights. Such forgetful times occur, for example, when the trip ends in a daylight period but commenced in a nighttime period, or ends in a lighted parking light, or ends after driving through a daytime storm with the headlights turned on. If the motorist is away long enough, and other persons are not able to help because the vehicle is locked, upon his or her return the battery power may not be sufficient to start the engine.

This happening has occurred throughout the years and previously there have been many inventions directed to avoiding or to lessen the effect of this forgetfulness. Some of these inventions have included additions to the circuitry of the ignition and lighting circuits, whereby alarms and/or signal lights have been activated. Also, upon the removal of the ignition key, after a time delay, the headlights are turned off. Moreover, upon the removal of the ignition key, the headlights are turned off and the parking lights are turned on. These are some of the built in inventions which are relied upon.

Also there have been other inventions designed for the removable placement of a headlight reminder apparatus in a vehicle, without changing the vehicle, such as Howard J. Dinstbir's warning device for vehicles, illustrated and described in his U.S. Pat. No. 3,237,330 in 1966, wherein a small sign, reading lights on, is supported on a suction cup, which is in turn placed on a dashboard of a vehicle. Moreover, Robert Splan in his U.S. Pat. No. 4,212,260 in 1980, disclosed his automobile headlight reminder device, which is suspended from a headlight switch, when the headlights are off, and then transferred to a door lock, when the headlights are on, whereby the door lock may not be utilized until the reminder is removed, and the motorist in doing so, remembers to turn off the headlights. Also, Lila, Richard, and Craig Walker in their U.S. Pat. No. 4,236,479 in 1980, illustrate and describe their headlight reminder. When the headlights are not on, a removable "Velcro" R attached knob is attached to the headlight switch. When the headlights are turned on, this knob is moved to a location such as a door handle, where it will be noticed as a reminder to the motorist to turn off the headlights before he or she leaves the vehicle.

Although these prior inventions have been available, there remains a need for such reminders, as most vehicles today still are not as yet equipped with any reminders which have been widely adopted by motorists.

SUMMARY

To fulfill the current extensive need for a reminder to caution a motorist that he or she is leaving a vehicle with the headlights and/or parking lights being left on unintentionally, a headlights on reminder is provided for a motorist, which in serving as a reminder, also serves as a key holder, and no alterations of a vehicle are necessary. Key holders, such as key rings, often are color coded to quickly identify the ignition key for a particular vehicle. The key holders are secured to a tether which in turn is secured to a hook. When the headlights are turned on, the hook is placed about a component of the car which is located within the reach of the tether, which commences at the key holder located at the ignition switch. It remains so secured until intentionally removed by the motorist, who has then been reminded to turn off the headlights.

Preferably the tether is elastic and stretchable to provide a distance range of placement of the hook and to keep the hook in place, while the ignition key is inserted in the ignition switch. In another embodiment, the tether, instead of extending directly between the hook and key holder, is arranged in a changeable length loop to provide the distance range, and yet to reduce the overall length of the headlight or reminder, when it is being carried and/or stored, as conveniently as a key holder per se would have been carried and/or stored.

DRAWINGS

The headlights on reminder is illustrated in the drawings in reference to two embodiments, wherein.

DESCRIPTION OF PREFERRED EMBODIMENTS

Figure 1:
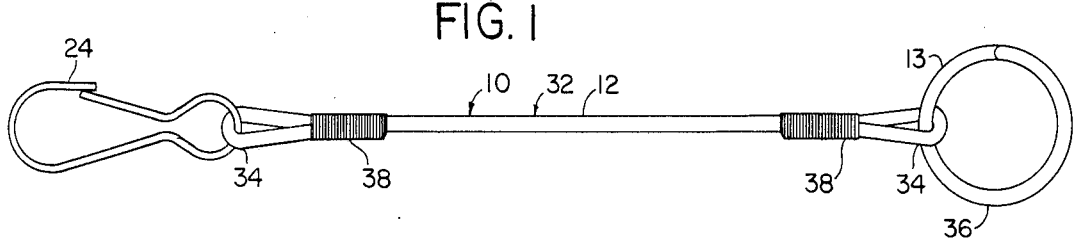
FIG. 1 is a perspective view of a selected vehicle indicating how the headlights on reminder is positioned, when the headlights are turned on, extending from the ignition switch, where the ignition key is inserted and held by the key holder, as its tether is extended to place its hook about a turn signal lever.

The headlights on reminder apparatus 10, as illustrated in FIG. 1, has a tether 12 which extends from a key holder 13, holding an ignition key 16, which is inserted into an ignition switch 18 on a dashboard 20 of a vehicle 22, to a hook 24, which is removably secured to a turning light lever 26, extending out from a steering column 28. On other type vehicles, the hook might be placed on another component of the vehicle.

Wherever the hook is placed when the headlight switch 30 is turned on, it remains. Then when the ignition switch is turned off and the vehicle is to be left for a while, the motorist is visually and functionally reminded that the headlights are still turned on. The driver then turns off the lights, releases the hook, pulls the ignition key out, and stores the key holder with the ignition key, often with other keys and the tethered hook in a pocket or purse.

Figure 2:
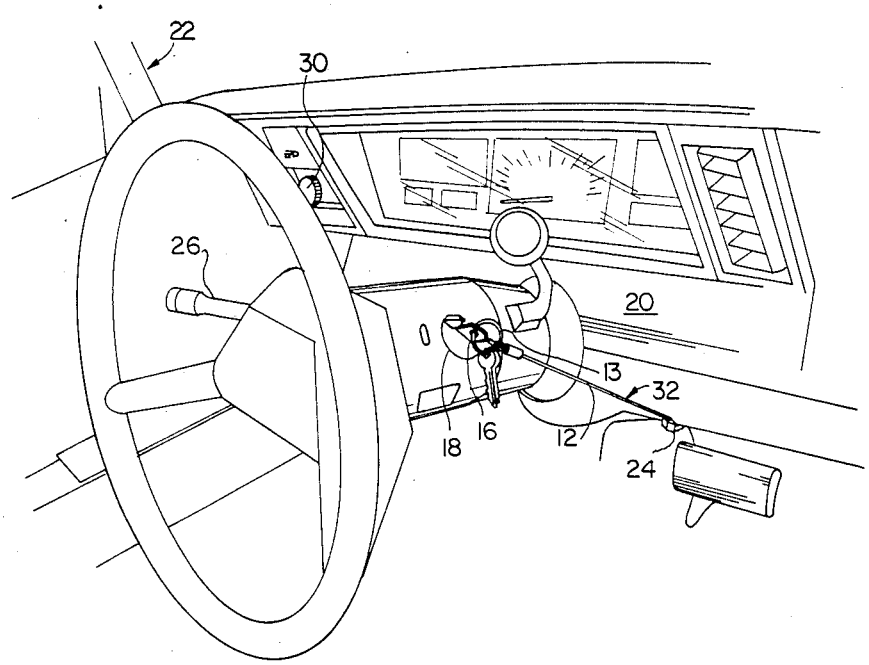
FIG. 2 is a side view of an embodiment of the headlights on reminder with the tether extending directly from the key holer to the hook.

An embodiment 32 of the headlights on reminder 10 is shown in FIG. 2, wherein the tether 12 extends directly between the key holder 13 and the hook 24. At one end, the tether 12 is loop wrapped 34 around a key ring 36, and in turn received a cord wrapping 38, which maintains the loop 34. At the other end, the tether 12 is loop wrapped 34 around a hook 24, and in turn receives a cord wrapping 38 to maintain a loop 34. Preferably, the tether 12 is made of resilient, stretchable, material to increase the range of securement of the headlights on reminder 10, yet to have it remain comparatively shorter when not being used.

Figure 3:
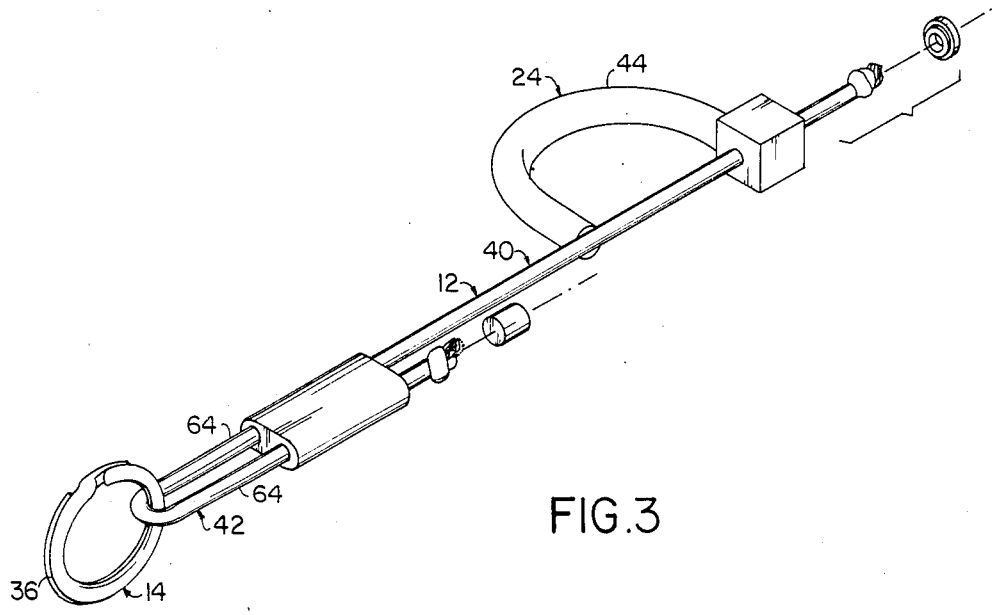
FIG. 3 is a side view of another embodiment of the headlights on reminder with the tether being arranged in a changeable length loop in extending from the key holder to the hook.
Figure 4:
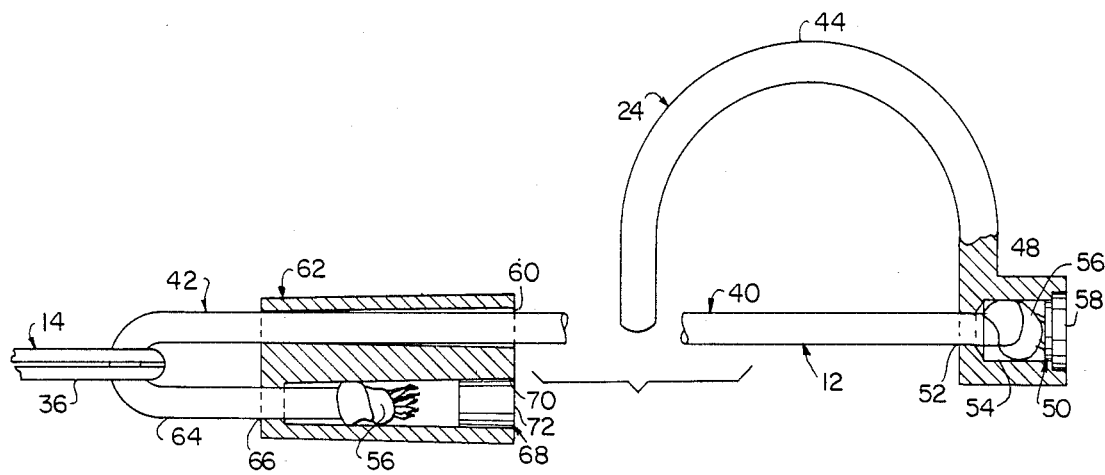
FIG. 4 is an exploded view of the headlights on reminder, illustrated in FIG. 3, to illustrate its assembly.

Another embodiment 40 is illustrated in FIGS. 3 and 4, wherein the tether 12 is arranged with a a variable sized loop 42, to increase the range of securement of the headlights on reminder 10, yet to have it remain comparatively shorter when not being used. Preferably this tether 12 is also made of resilient, stretchable material.

The hook 24 is a semi-circular ring 44 with a rounded end 46, and a receiver end 48, the latter end 48 having a passageway 50, commencing in a smaller diameter portion 52 and ending in a larger diameter portion 54. The tether 12 is inserted through the passageway 50, first through the portion 52 then through the portion 54, to be thereafter tied in a terminal knot 56, and thereafter pulled back to seat the knot 56 in the larger diameter portion 54. Such seating of the knot 56 is insured by sealing a cap 58 in place in the larger diameter portion 54. The semi-circular ring 44 is arranged, when so installed, to be alongside the tether 12.

The tether 12, thereafter, is arranged to slidably pass through a guiding passageway 60 of a receiving and guiding body 62 and to extend beyond to form a changeable size loop 64, to which a key holder 14 is secured, such as the key ring 36. To complete the loop 64, the otherwise remaining free end of the tether 12 is passed through the smaller diameter portion 66 of the receiving passageway 68 and beyond through the larger diameter portion 70 to be tied in a terminal knot 56 and then pulled back into the larger diameter portion 70. Thereafter, a cap 72 is sealably placed in the larger diameter portion 70 to keep the knotted end of the tether 12 in place, as shown in FIGS. 3 and 4.

When the loop 64 is larger, the loop tether embodiment 40 of the headlights on reminder is more compact. When the loop 64 is smaller, the tether 12 is extended to a greater range, equalling the distance between where the hook 24 is removably secured to a component of the vehicle 22, such as the turning light lever 26, and the key holder 14, such as the key ring 36, on which the ignition key 16 is secured, as it is then inserted in the ignition switch 18 at the dashboard 20.

This headlights on reminder 10 arranged in the embodiments 32 and 40, or other embodiments, serves the motorists in many ways while performing the primary reminding service that the vehicle headlights are turned on. This reminder apparatus 10 is believed to be removably utilized with all types of vehicles. No longer will the motorist return to his or her car to soon learn the car will not start because the headlights had been left on. There will no longer be the delays caused by seeking assistance to start the vehicle, by using jumping cables, or cigarette socket source charging cables, or being pushed or towed, or awaiting a replacement charged battery.

I claim:

1. A headlights on reminder apparatus serving to remind a driver of a vehicle that he or she has the headlights turned on, before he or she removes an ignition key from an ignition switch, comprising:
    (a) an adjustable effective length tether made of resilient, stretchable, and retractable, material, whereby when the tether is inactive; the tether becomes shortened in length for placement in a person's pocket or purse, and when the tether is being actively used, then the tether is elongated for placement of a hook about a vehicle component located near an ignition switch when the headlights have been turned on;
    (b) said hook having a semicircular shape commencing at one rounded terminus end, and terminating at a second terminus end, said second terminus end having a receiving passageway commencing in a smaller diameter portion and ending in a larger diameter portion, in which the tether at one end is moved through the smaller diameter portion of the receiving passageway, and then knotted to be anchored in the larger diameter portion, and thereafter a cap is placed to seal the larger diameter portion;
    (c) a receiving, guiding, and anchoring body, having a guiding passageway for the in and out sliding movement of the tether coming from the hook, and having an adjacent receiving passageway of smaller diameter portion at the outset, and then a larger diameter portion, for the entry of a second end of the tether through the smaller diameter portion and then the securement of said second end of the tether, as the tether is knotted and drawn into the larger diameter portion, after the tether has been formed as an adjustable effective sized loop, which receives an ignition key via a key ring, and thereafter a cap seals the larger diameter portion; and
    (d) said key ring being slidably secured to the tether on the adjustable effective sized loop; the ignition key cannot be removed from the ignition switch of the vehicle without disengaging said hook from said vehicle without disengaging said hook from said vehicle component, whereby the driver of the vehicle is reminded that the vehicle headlights are turned on.

* * * * *